(12) United States Patent
Vidal et al.

(10) Patent No.: US 9,101,154 B2
(45) Date of Patent: Aug. 11, 2015

(54) METHOD AND APPARATUS FOR TREATING VEGETABLE TISSUES IN ORDER TO EXTRACT THEREFROM A VEGETABLE SUBSTANCE, IN PARTICULAR A JUICE

(75) Inventors: Olivier Pierre Vidal, Fontainebleau (FR); Eugene Vorobiev, Compiegne (FR)

(73) Assignees: Maguin SAS, Charmes (FR); Universite De Technologie De Compiegne, Compiegne (FR)

( * ) Notice: Subject to any disclaimer, the term of this patent is extended or adjusted under 35 U.S.C. 154(b) by 0 days.

(21) Appl. No.: 13/696,040

(22) PCT Filed: Apr. 29, 2011

(86) PCT No.: PCT/EP2011/056863
§ 371 (c)(1),
(2), (4) Date: Jan. 10, 2013

(87) PCT Pub. No.: WO2011/138248
PCT Pub. Date: Nov. 10, 2011

(65) Prior Publication Data
US 2013/0202751 A1    Aug. 8, 2013

(30) Foreign Application Priority Data
May 3, 2010   (FR) .................................... 10 53413

(51) Int. Cl.
| | |
|---|---|
| A23L 1/025 | (2006.01) |
| A23L 2/04 | (2006.01) |
| A47J 19/06 | (2006.01) |
| A23L 2/68 | (2006.01) |

(Continued)

(52) U.S. Cl.
CPC . *A23L 2/04* (2013.01); *A23L 1/025* (2013.01); *A23L 2/68* (2013.01); *A23N 1/006* (2013.01); *A23N 1/02* (2013.01); *A47J 19/06* (2013.01)

(58) Field of Classification Search
CPC .............. A23L 1/025; A23L 2/02–2/06; A47J 19/00–19/06; A23N 1/00–1/02
USPC .............................. 426/238, 244, 489; 99/451
See application file for complete search history.

(56) References Cited

U.S. PATENT DOCUMENTS

| | | | | |
|---|---|---|---|---|
| 1,382,449 | A * | 6/1921 | Andrysiak | ...................... 241/92 |
| 1,982,742 | A * | 12/1934 | Keenan | ........................... 99/509 |
| 2,183,837 | A * | 12/1939 | Hamilton et al. | ............... 554/12 |

(Continued)

FOREIGN PATENT DOCUMENTS

| | | |
|---|---|---|
| WO | WO 0162482 A1 | 2/2001 |
| WO | WO 2008034228 A1 | 3/2008 |

OTHER PUBLICATIONS

Bouzrara, et al., "Solid-Liquid Expression of Cellular Materials Enhanced by Pulsed Electric Field", Chemical Engineering and Processing, vol. 42, No. 4; pp. 249-257 (2003).

(Continued)

*Primary Examiner* — Drew Becker
(74) *Attorney, Agent, or Firm* — Morgan, Lewis & Bockius LLP

(57) ABSTRACT

The apparatus for treating plant tissues using a pulsed electric field is intended for the extraction of plant substances from tissues, in particular a juice. It comprises a step of compacting (3) the plant tissues and at least one treatment chamber (4) comprising means for the generating a pulsed electric field in said chamber for treating the compacted tissues.

7 Claims, 3 Drawing Sheets

(51) Int. Cl.
*A23N 1/00* (2006.01)
*A23N 1/02* (2006.01)

(56) References Cited

U.S. PATENT DOCUMENTS

| | | | |
|---|---|---|---|
| 2,497,670 A * | 2/1950 | Hanson et al. | 219/686 |
| 2,807,560 A * | 9/1957 | Brownell et al. | 127/43 |
| 3,248,060 A * | 4/1966 | Harsanyi | 241/1 |
| 3,346,392 A * | 10/1967 | Lowe et al. | 426/481 |
| 4,723,483 A * | 2/1988 | Papchenko et al. | 99/451 |
| 2003/0165608 A1 * | 9/2003 | Cousin et al. | 426/615 |
| 2005/0199134 A1 * | 9/2005 | Schultheiss et al. | 99/451 |
| 2006/0106210 A1 * | 5/2006 | Frenzel et al. | 536/124 |
| 2007/0202601 A1 * | 8/2007 | Swoboda | 435/459 |
| 2008/0060637 A1 * | 3/2008 | Arnold et al. | 127/4 |
| 2008/0279995 A1 * | 11/2008 | Schultheiss et al. | 426/238 |
| 2009/0314630 A1 * | 12/2009 | Ngadi et al. | 204/165 |
| 2011/0038992 A1 * | 2/2011 | Arnold et al. | 426/238 |
| 2012/0294993 A1 * | 11/2012 | Singleton et al. | 426/237 |

OTHER PUBLICATIONS

Vorobiev, et al., "States of Constant Pressure" World Filtration Congress, Proceedings, XX, XX; pp. 968-976 (Apr. 1, 2004).

* cited by examiner

METHOD AND APPARATUS FOR TREATING VEGETABLE TISSUES IN ORDER TO EXTRACT THEREFROM A VEGETABLE SUBSTANCE, IN PARTICULAR A JUICE

CROSS-REFERENCES

This application is a U.S. National stage application of PCT/EP2011/056863, filed on Apr. 29, 2011 which claims priority to French Patent Application No. 1053413 filed on May 3, 2010. Each of which is incorporated by reference in there entireties for all purposes.

The invention relates to the treatment of harvested vegetables and, in particular, to the treatment of harvested vegetables with a view to extracting there from a vegetable substance, in particular a juice.

More particularly, the invention relates to a treatment of vegetable tissues with a pulsed electric field.

One particularly advantageous application of the invention relates to the treatment of sugar beet for the sugar industry.

BACKGROUND OF THE INVENTION

It has already been proposed in the prior art to treat beet cossettes or other vegetable matter, such as chicory, potatoes, carrots, fruits with pulsed electric fields in order to extract substances there from.

Specifically, by subjecting a vegetable tissue to pulses of an electric field, the cellular membranes of the tissue are rendered permeable or destroyed so that the cellular juice can be recovered. Such a technique is generally known by the term "electroporation".

In this regard, reference may be made to the document WO 2009/129991, which describes such a method for the electroporation of beet cossettes with a pulsed electric field.

In the method described in said document, the beets are first ground into cossettes, and a liquid phase is added to the cossettes. The mixture obtained is subsequently conveyed without pressure into a reaction chamber in which a pulsed electric field is sustained.

This method requires the use of a conductive liquid mixed with the cossettes in order, on the one hand, to facilitate their delivery to the treatment chamber and, on the other hand, to overcome the drawbacks associated with the relative inhomogeneity of the mixture of cossettes in the treatment chamber, creating nonconductive voids between the cossettes.

The presence of this liquid phase requires the use of a pulsed electric field generator having a high capacity, of the order of 60 kV, and consequently a treatment chamber having relatively large dimensions.

It is therefore an object of the invention to overcome this drawback and to provide a method for treating vegetable tissues which makes it possible to extract a juice from the tissues without requiring the use of a liquid phase.

SUMMARY OF THE INVENTION

The invention therefore relates, according to a first aspect, to a method for treating vegetable tissues with a pulsed electric field in order to extract therefrom a vegetable substance, in particular a juice, wherein the vegetable tissues are compacted in order to reduce the residual space between the tissues, and the compacted vegetables are subjected to a pulsed electric field in at least one treatment chamber.

Thus, by virtue of this prior compacting phase, it is possible to bring the vegetable tissues into the form of a compact volume making it possible to reduce the residual space between pieces of tissue and, consequently, to distribute the pulsed electric field homogeneously through the vegetable tissues.

Furthermore, this compacting phase makes it possible to convey the vegetable tissues to the treatment chamber or chambers without needing to mix the tissues with a liquid phase. While maintaining a constant generator capacity, it is then possible to treat more vegetable tissues. While maintaining a constant vegetable treatment capacity, it is possible to reduce the capacity of the generator and/or the quantity of the generator or generators and the size of the treatment chamber or chambers.

In one embodiment, after the treatment of the vegetable tissues with a pulsed electric field, a first juice is extracted from the treatment chamber.

This is because it has been observed that the prior phase of stressing the vegetable tissue makes it possible to obtain a first pressing juice easily. It has furthermore been observed that this first juice is of increased purity.

According to yet another characteristic of this treatment method, after the extraction of the first juice, the vegetable tissues are subjected to an additional juice extraction treatment. For example, it is possible to use a treatment of extraction by diffusion or pressing.

Preferably, before the step of compacting the vegetable tissues, cutting of the vegetables is carried out. Such a prior cutting step makes it possible to improve the homogeneity of the mixture in the treatment chamber or chambers by further reducing the space between the vegetables.

For example, a root-cutting tool is used for this purpose.

The method may furthermore comprise a prior step of washing the vegetables. It is furthermore possible to inject compressed air into the treatment chamber before the treatment of the compacted tissues with a pulsed electric field.

According to yet another characteristic of the extraction method, the step of treating the compacted vegetables is carried out by means of one or more treatment chambers arranged in series or in parallel.

Thus, even when using pulsed electric field generators of relatively low capacity and treatment chambers of relatively small dimensions, it is possible to treat relatively large masses of vegetable tissues.

It is furthermore possible to regulate the parameters of the pulsed electric field as a function of the nature of the vegetables to be treated.

The invention also relates, according to a second aspect, to an apparatus for treating vegetable tissues with a pulsed electric field in order to extract there from a vegetable substance, in particular a juice.

This apparatus comprises a stage of compacting the vegetable tissues and at least one treatment chamber comprising means for generating a pulsed electric field in said chamber in order to treat the compacted tissues.

This apparatus furthermore comprises, in one embodiment, means for extracting a first juice coming from the treatment chamber.

This apparatus may also comprise an additional stage of treatment of the vegetable tissues, in particular by diffusion or by pressing, which is arranged downstream of the treatment chamber.

According to yet another characteristic of the apparatus, it comprises a stage of cutting the vegetables, which is arranged upstream of the compacting stage.

This cutting stage may comprise a root cutter.

In one embodiment, the means for generating a pulsed electric field comprise a pulsed electric field generator delivering an electric field of between about 0.1 and 1 kV/cm.

BRIEF DESCRIPTION OF THE DRAWINGS

Other objects, characteristics and advantages of the invention will become apparent on reading the following description, which is provided merely by way of non-limiting example and given with reference to the appended drawings, in which.

DETAILED DESCRIPTION OF THE INVENTION

Figure 1:
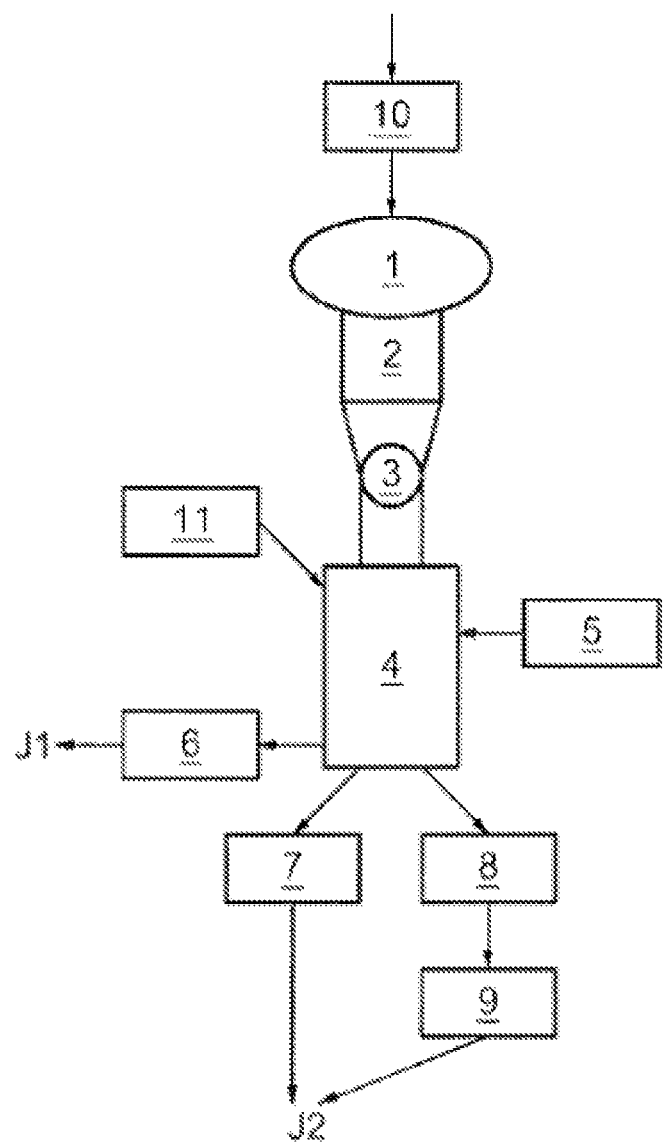
FIG. 1 schematically illustrates a first exemplary embodiment of an apparatus for treating vegetable tissues according to the invention.

FIG. 1 represents a first exemplary embodiment of an apparatus for treating vegetable tissues according to the invention.

This apparatus is intended to treat, with a pulsed electric field, vegetable tissues taken from harvests, in particular but not exclusively sugar beet with a view to recovering there from a cellular juice and, in general, a vegetable substance, for example pulp.

It will be noted that, when the apparatus is intended for the treatment of all types of vegetables, fruits, plants or legumes with a view to extracting there from a juice or a substance, this does not depart from the scope of the invention.

The treatment used is based on the application of a pulsed electric field to the vegetables to be treated.

Specifically, when vegetable tissue is placed in an electric field, the difference between the intra- and extracellular compositions generates an accumulation of electric charges on the membrane surfaces and an increase in the transmembrane potential.

The attraction between the charges of opposite signs accumulated on either side of the membrane causes compression of the latter.

The elastic force generated by the membrane tends to oppose this compression. When the applied electric field exceeds a critical value, the compression force applied on either side of the membrane under the effect of the attraction of the charges of opposite signs becomes greater than the resisting elastic force of the membrane, and pores appear, or they are enlarged if they exist in the membrane. At this stage, the electroporation is assumed to remain reversible. When the amplitude of the electric field and/or the duration of its application are increased, irreversible permeabilization and destruction of the cellular membrane are observed, then making it possible to recover the cellular juice.

Thus, the apparatus illustrated in FIG. 1 essentially comprises, considering the treatment direction of the vegetable tissues: a first stage 1 of cutting the vegetables; a stage 2 of conveying the cut vegetables, for example a volumetric conveyor system; a third stage 3 of compacting the cut tissues, arranged downstream of the second conveying stage 2; and a chamber 4 for treatment of the cut and compacted vegetables, which is associated with a pulsed electric field generator 5.

The cutting stage 1 corresponds to the first stage of the apparatus. It is supplied with vegetables to be treated, as harvested. This stage 1 is adapted to cut the vegetables with a specific geometry making it possible to reduce the void ratio between the cut elements once they are amassed. To this end, for example, a root cutter traditionally used in the beet, sugar or chicory industry is used. For other roots, such as manioc, a grater may be used.

The compacting stage 3, for its part, pressurizes the cut vegetables in order to further reduce the residual space between the vegetables and, in particular, the space between the cut vegetables.

In other words, the purpose is to deliver a homogeneous mass of cut vegetables to the treatment chamber 4, minimizing the spaces without vegetable matter so that it is not necessary to use a liquid phase or an electrically conductive gel in the treatment chamber, and consecutive treatments involving loss of such a phase or such a gel.

This compacting phase may be carried out by any suitable tool or press capable of exerting a sufficient pressure on the cut vegetables so as to compact them and thus reduce the residual spaces, without exerting an excessive pressure tending to result in juice extraction.

As indicated above, downstream of the compacting stage, the apparatus comprises a treatment chamber associated with a pulsed electric field generator 5.

During operation, the generator 5 is intended to create and sustain a pulsed electric field in the internal volume of the chamber 4, which is filled with cut and compacted vegetables, the parameters of which field may be adapted as a function of the nature of the vegetables treated.

It is thus possible, for example, to vary the frequency, the width of the pulses, the output voltage and, in general, the shape of the voltage signal delivered by the generator as a function of the nature of the vegetable tissues to be treated. These parameters may also be modified in order to adapt to the quality or characteristics of the products as a function of the growing areas or climatic conditions, or in the event of diseases.

It will, however, be noted that, by virtue of the prior compacting step, it is possible to convey the vegetables to the treatment chamber without mixing the vegetables with a liquid phase.

It is also possible, by virtue of this compacting phase, to use a treatment chamber of small dimensions as well as a pulsed electric field generator 5 of low capacity, in so far as this compacting step obviates the use of a liquid phase or an electrically conductive gel in order to fill the empty spaces which would otherwise exist between the vegetables and, consequently, all treatments involving loss of this liquid phase or this gel.

It is thus possible to use a pulsed electric field generator with a power of between 15 and 20 kV, capable of providing an electric field of between about 0.1 and 1 kV/cm in the treatment chamber 4.

Likewise, the treatment chamber 4 may, by way of nonlimiting example, have a cross section of between 50 mm and 500 mm, and a length of between 200 mm and 2 m approximately, depending on the cross section.

Such characteristics make it possible to treat masses of vegetable tissues of between about 1 and 150 ton(s)/hour.

It will be noted that the prior compacting phase combined with the treatment with pulsed electric fields makes it possible to provide a stage 6 of extraction of a first juice J1 at the exit of the treatment chamber 4.

Specifically, the pulsed electric fields make it possible to treat vegetables during very short voltage peaks, of the order of a few microseconds, generating very little dissipation of electrical energy by the Joule effect in the vegetable tissue. It is thus possible to obtain a cold juice of high purity, and in any event, of increased quality compared with the traditional techniques of extraction by pressing or diffusion.

It will be noted that, for beet juice, it is generally necessary to employ a subsequent phase of lime and carbon dioxide purification. In so far as the prior compacting phase and the treatment with a pulsed electric field make it possible to obtain a juice of increased purity, this subsequent purification phase is greatly facilitated. The purification may then be of the less intensive lime and carbon dioxide type, but also either partially or else entirely purification using microfiltration and ultrafiltration membranes, depending on the nature of the vegetables and the quality of the extracted juices.

Downstream of the treatment chamber 4, the apparatus also comprises additional vegetable tissue treatment stages, of conventional type, allowing complementary extraction of a juice J2.

For example, as illustrated, it is possible either to use a stage 7 of treatment by pressing or, as a variant, a stage 8 of treatment by diffusion followed by a stage 9 of treatment by pressing.

Lastly, it will be noted that the apparatus may furthermore be provided with a stage 10 of washing the vegetables, for example arranged upstream of the cutting stage 1.

Thus, by virtue of the presence of this washing stage, which makes it possible to impart a degree of moisture to the vegetables in the form of a film on the surface of the vegetables, the apparatus may be provided with an optional stage 11 of compressed air injection into the treatment chamber before the first electric field application, in order to create a humid atmosphere in this chamber in the form of a mist, further increasing the treatment efficiency by creating an electrically conductive atmosphere in the treatment chamber 4 while also making it possible to lubricate the walls of the chamber.

It will be noted that, by virtue of the use of the compacting phase combined with the use of a pulsed electric field generator of relatively low capacity and with a treatment chamber of reduced dimensions, the invention which has just been described makes it possible to obtain treatment apparatuses of reduced dimensions or to obtain an increase in the quality of the recovered juices and in the efficiency of the treatment carried out in the additional treatment stages 7, 8 and 9 following an increase in the pressing ratios, a reduction in the diffusion extraction, a reduction in temperature, etc.

It will, however, be noted that the invention is not limited to the embodiment described.

Specifically, in the embodiment described above, the apparatus comprises a single treatment chamber 4 associated with a pulsed electric field generator 5.

Figure 2:
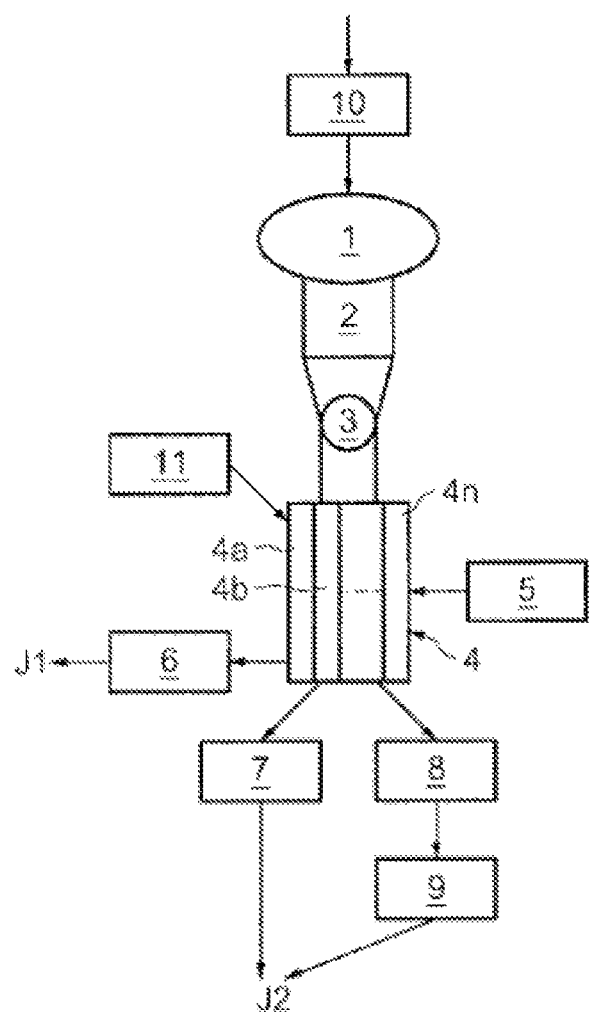
FIG. 2 illustrates a second embodiment of an apparatus for treating tissues according to the invention.
Figure 3:
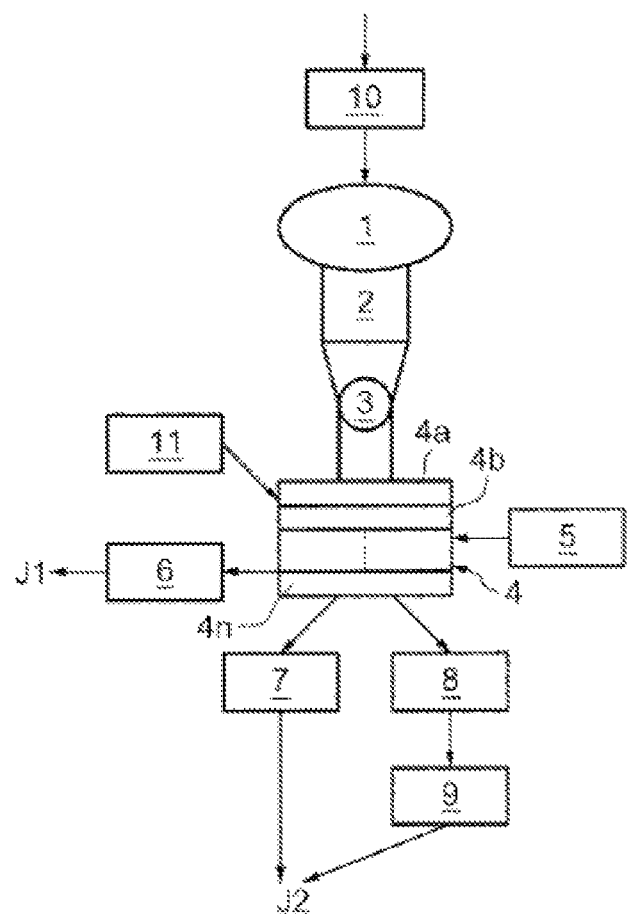
FIG. 3 illustrates a third embodiment of an apparatus for treating tissues according to the invention.

With a view to increasing the treatment capacity, it is possible to use a plurality of treatment chambers arranged in parallel (FIG. 2) or, as a variant, in series (FIG. 3).

It will be noted that it is possible to provide as many treatment chambers as necessary in parallel or in series, supplied by one or more generators in parallel, in order to ensure sufficient electroporation compatible with industrial treatment methods.

The invention claimed is:

1. A method for treating vegetable tissues with a pulsed electric field in order to extract there from a juice, characterized in that:
   the vegetable tissues are compacted in order to reduce the residual space between the vegetable tissues, without exerting a pressure tending to result in juice extraction,
   the compacted tissues are conveyed to at least one treatment chamber (4) without needing to mix the compacted tissues with a liquid phase,
   the compacted tissues are subjected to a pulsed electric field in said at least one treatment chamber (4), and in that, after the treatment of the compacted tissues with a pulsed electric field, a first juice is extracted from the treatment chamber (4).

2. The method of claim 1, characterized in that, after the extraction of the first juice, the compacted tissues are subjected to an additional juice extraction treatment by diffusion or pressing.

3. The method of claim 1, characterized in that, before the step of compacting the vegetable tissues, cutting of the vegetables is carried out.

4. The method of claim 3, characterized in that the cutting is carried out by means of a root-cutting tool.

5. The method of claim 1, characterized in that it comprises a prior step of washing the vegetables, and in that compressed air is injected into the treatment chamber before the treatment of the compacted tissues with a pulsed electric field.

6. The method of claim 1, characterized in that said at least one treatment chamber (4) is a plurality of treatment chambers arranged in series or in parallel.

7. The method of claim 1, characterized in that the parameters of the pulsed electric field are regulated as a function of the nature of the vegetables to be treated.

* * * * *